Oct. 19, 1971    J. B. DAVIS    3,613,177
ANCHORING CLIP FOR MOUNTING APPLIANCES
Filed July 27, 1970

INVENTOR.
John B. Davis
BY
ATTORNEY

United States Patent Office 3,613,177
Patented Oct. 19, 1971

3,613,177
ANCHORING CLIP FOR MOUNTING
APPLIANCES
John B. Davis, Big Flats, N.Y., assignor to Corning
Glass Works, Corning, N.Y.
Filed July 27, 1970, Ser. No. 58,264
Int. Cl. A44b 21/00; E03c 1/18
U.S. Cl. 24—73 B                                5 Claims

ABSTRACT OF THE DISCLOSURE

An anchoring clip having a U-shaped clamping portion with an interlocking tab, a gripping arm with bite-in ear portions, and a removal flange, is lockably positioned upon a mounting frame of a drop-in or surface-mounted appliance, such as a sink or cook-top. With a plurality of such anchoring clips secured about the periphery of the mounting frame, the appliance is lowered into position within a pre-cut opening formed in a counter top or the like, and the bite-in ears of the gripping arm are forced into a surface of the counter top surrounding the opening to securely mount and lockably position the appliance within the opening.

BACKGROUND OF THE INVENTION

In the past it has been customary to mount drop-in or surface-mounted appliances within an opening in a counter top by utilizing a plurality of screw-threaded lugs which receive a threaded stud to individually tighten and clamp the appliance to the counter top by means of the mounting frame. In many cases, it was virtually impossible to gain access to the necessary area under the counter top in order to suitably tighten the studs or bolts within the lugs.

The present invention obviates the problems encountered with the prior art devices by providing an inexpensive and easily mountable anchoring clip for securely retaining drop-in or surface-mounted appliances in position within a counter top or the like.

SUMMARY OF THE INVENTION

An improved anchoring clip of unitary construction is formed of strip steel, such as .025 inch SAE 1064 steel. The anchoring clip has a U-shaped clamping portion terminating at one upper end in a gripping arm and at the other upper end in a removal flange portion. An interlocking tab is formed out of the body of the clamping portion to project within a recess formed in the mounting frame and thereby lockably retain the clip on the frame. The gripping arm has a pair of turned-down ears on the outer end thereof which bite into an inner peripheral wall of the counter top surrounding the appliance to securely hold the appliance in position. The removal flange is formed on the upper end of the U-shaped portion having the interlocking tab, so as to facilitate the flexing of the U-shaped portion outwardly and effect an unlocking of the tab from the mounting frame, so that the clip may be withdrawn therefrom and the appliance removed from the counter top.

It thus has been an object of the present invention to provide an improved easily mountable anchoring clip for lockably retaining a drop-in or surface-mounted appliance in position while facilitating an easy removal thereof.

DESCRIPTION OF THE PREFERRED EMBODIMENTS

Figure 1:
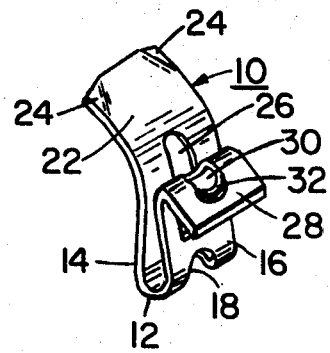
FIG. 1 is a perspective view of an anchoring clip embodying the present invention.
Figure 2:
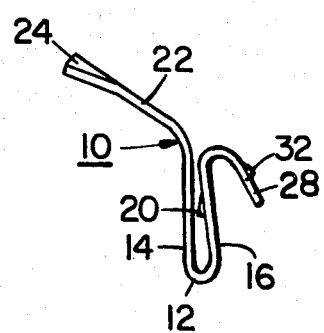
FIG. 2 is a side elevational view of the anchoring clip shown in FIG. 1.
Figure 3:
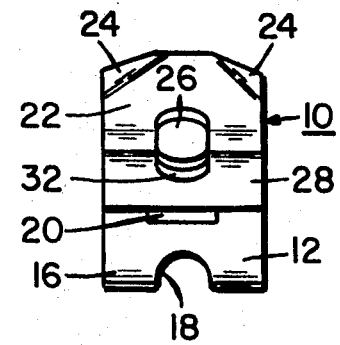
FIG. 3 is a rear elevational view of the clip shown in FIG. 1.

Referring now to the drawings, and particularly FIGS. 1–3 inclusive, an anchoring clip 10 is shown comprising a U-shaped clamping portion 12, a gripping arm 22, and a removal flange 28. The U-shaped clamping portion 12 is composed of a pair of legs 14, 16 having a relieved portion 18 formed in the U-shaped portion joining their lower ends. The clamping portion 12 has an interlocking tab 20 formed centrally of the body portion of leg 16.

The gripping arm 22 has a pair of turned-down bite-in ear portions 24 at its outer end for biting into an inner peripheral surface of the counter top. An opening 26 is formed in the clip 10 adjacent the intersection of leg 14 and gripping arm 22 so as to provide greater flexibility or resiliency within the arm 22 as the outer end grips the surrounding surface of the counter top. The removal flange 28, formed on the outer extension of leg 16, has an opening 30 provided with an offset or boss portion 32. The removal flange is adapted to be engaged by a suitable tool, such as needle nose pliers, which may project upwardly through opening 30 and operatively grasp boss portion 32 so as to flex leg 16 of clamping portion 12 away from leg 14 and thereby disengage interlocking tab 20 from a mounting frame for removal therefrom. The relieved portion 18 provides the required flexing between legs 14 and 16 necessary to remove the clip when grasping removal flange 28 by pliers or other suitable tools.

Figure 4:
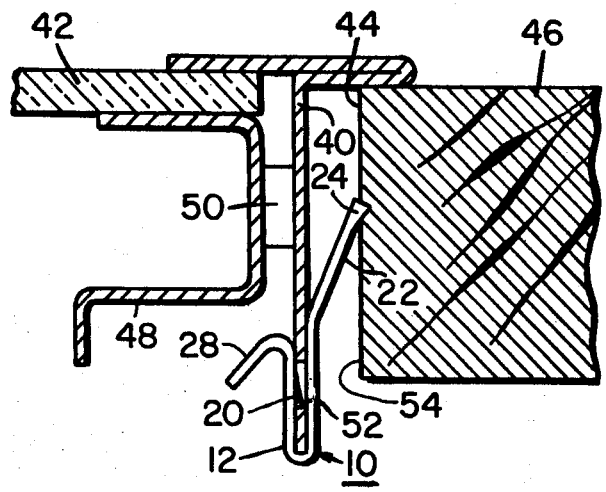
FIG. 4 is a somewhat schematic elevational view in section showing the anchoring clip in an operative position mounting an appliance within an opening formed in a counter top.

Referring now to FIG. 4, an anchoring clip 10 is shown in position upon a T-shaped mounting frame 40 which extends circumferentially about the periphery of an appliance 42 to be mounted within a recess 44 formed in a counter top or the like 46. The mounting frame 40 is secured to a support frame 48 for the appliance 42 by any suitable means such as webs or brackets 50. As shown, the interlocking tab 20 projects within an opening 52 formed in mounting frame 40, and turn-down bite-in ear portions 24 are shown embedded within inner peripheral surface 54 of the counter top 46 surrounding recess 44.

In operation, a plurality of anchoring clips 10 are positioned on mounting frame 40 about the periphery of the appliance 42, with the gripping arm 22 projecting upwardly and outwardly. The U-shaped clamping portion 12 of each anchoring clip 10 has an interlocking tab 20 which projects within an opening or recess 52 formed in a lower portion of the mounting frame 40, and thus securely locks the anchoring clip onto the mounting frame. A recess 44, comforming to the size and shape of the appliance 42, is formed in the surface of the counter top 46, and the appliance, with the anchoring clips positioned about its periphery, is then positioned downwardly within the recess 44. Due to the resiliency of the gripping arms 22, the assembly is permitted to move downwardly within the recess, however when the appliance is fully inserted as limited by the upper portion of the T-shaped mounting frame 40, the gripping arms flex outwardly toward the inner peripheral surface 54 of the counter top 46 and ear portions 24 bite into or grip such surface so as to prevent the appliance from being withdrawn from the recess. In fact, as can be seen in FIG. 4, any upward pull on the appliance will create a greater bite or gripping of the ear portions 24 within the inner peripheral surface 54 of the counter top 46. Flexibility is imparted to gripping arm 22 through the removal of material at the junction or intersection of leg 14 and arm 22 by means of open portion 26.

Should it be desirable to remove the appliance from the counter top, such as for servicing, a suitable tool such as a pliers is utilized to grasp removal flange 28 and flex leg 16 away from leg 14 so as to remove interlocking tab 20 from recessed portion 52 formed in the mounting frame 40 and pull the clip 10 downwardly for removal from the frame. Opening 30 and boss portion 32 are provided in removal flange 28 to facilitate the removal of the clip by means of a needle nose pliers which may project within the opening and grasp the boss portion for an easy flexing and downward removal of the anchoring clip from the frame 40. The amount of force required to flex the leg 16 away from leg 14, in order to facilitate removal of the clip from the mounting frame, is controlled by the width of recessed portion 18, provided at the bottom of the U-shaped clamping portion 12. After servicing, new clips may be applied, or the used clips may be reapplied to the mounting frame 40 and the appliance reinserted within the recess 44 in the manner in which it was originally mounted.

Although I have described the now preferred embodiments of my invention it will be apparent that various changes and modifications may be made thereto without departing from the spirit and scope thereof as defined in the appended claims.

I claim:

1. An anchoring clip of unitary construction for securely mounting and retainably positioning an appliance having a peripheral mounting frame within a recess formed in a counter top which comprises, a U-shaped clamping portion having a pair of upwardly extending legs, a gripping arm extending from one of said legs and having turned-down bite-in ear portions formed on its outer end for engaging an inner peripheral surface of the recess formed in said counter top, an interlocking tab formed in the body portion of the other of said pair of legs for engaging an opening in said mounting frame and lockably retaining said anchor clip thereon, and a removal flange extending from the other of said pair of legs for flexing said U-shaped clamping portion to retract said interlocking tab and remove said clip from said mounting frame.

2. An anchoring clip as defined in claim 1 wherein said gripping arm extends upwardly and outwardly from said one leg, and means formed at the intersection of said one leg and said gripping arm for imparting flexibility to said gripping arm to facilitate a biting engagement of said ear portions within said inner peripheral surface of the recess formed in said counter top.

3. An anchoring clip as defined in claim 1 wherein a relieved portion is formed in said U-shaped clamping portion adjacent the lower ends of said pair of legs so as to facilitate the flexing of said legs adjacent said lower portion when removing said clip from the mounting frame.

4. An anchoring clip as defined in claim 1 wherein said removal flange extends downwardly from its intersection with said other leg and is provided with means for grasping the same with a suitable tool.

5. An anchoring clip as defined in claim 4 wherein said means for grasping the same with a suitable tool includes an opening formed through said removal flange and an off-set boss portion adjacent said opening, wherein a needle nose pliers may project through said opening and grasp said boss portion so as to effect an outward flexing of the interlocking tab and downward removal of the clip from the mounting frame.

References Cited

UNITED STATES PATENTS

| | | | |
|---|---|---|---|
| 2,511,808 | 6/1950 | Petri | 24—73 FT X |
| 2,778,032 | 1/1957 | Meehan | 4—187 A |
| 2,911,693 | 11/1959 | McMullen | 24—73 B |
| 3,060,535 | 10/1962 | Munse | 24—73 B |

DONALD A. GRIFFIN, Primary Examiner

U.S. Cl. X.R.

4—187 A; 219—463; 248—27